(12) United States Patent
Petrick et al.

(10) Patent No.: US 6,538,253 B2
(45) Date of Patent: Mar. 25, 2003

(54) SELF CYCLING SOLID STATE X-RAY DETECTOR

(75) Inventors: Scott W. Petrick, Sussex, WI (US); Richard G. Cronce, New Berlin, WI (US); Donald E. Castleberry, Niskayuna, NY (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 249 days.

(21) Appl. No.: 09/752,029

(22) Filed: Dec. 29, 2000

(65) Prior Publication Data

US 2002/0084421 A1 Jul. 4, 2002

(51) Int. Cl.[7] .............................................. H01L 25/00
(52) U.S. Cl. ................ 250/370.09; 250/208.1
(58) Field of Search ...................... 250/370.09, 208.1; 378/98.5, 98.8; 348/164, 302; 257/292

(56) References Cited

U.S. PATENT DOCUMENTS

| | | | |
|---|---|---|---|
| 6,404,854 B1 * | 6/2002 | Carroll et al. ............. 378/98.8 |
| 6,407,770 B1 * | 6/2002 | Bielski et al. .............. 348/187 |
| 6,445,022 B1 * | 9/2002 | Barna et al. ................ 257/292 |
| 2002/0001366 A1 * | 1/2002 | Tamura et al. ............. 378/155 |
| 2002/0050568 A1 * | 5/2002 | Nonaka ................. 250/370.09 |

* cited by examiner

Primary Examiner—David Porta
Assistant Examiner—Christine Sung
(74) Attorney, Agent, or Firm—Fletcher, Yoder & Van Someren

(57) ABSTRACT

A technique is provided for automatically initiating reset of a digital detector. Generally, a digital detector has an array of rows and columns of pixels, read out electronics and scan electronics, that are configured to generate and transmit signals based upon radiation impacting the detector. The technique incorporates an automatic reset circuit that provides state machines to implement a reset if no readout or scrub command is received within a set time interval, or if communication with a readout control circuit is not available. The technique also includes methods for monitoring inputs, and resetting the charge on the rows and columns of pixels.

24 Claims, 3 Drawing Sheets

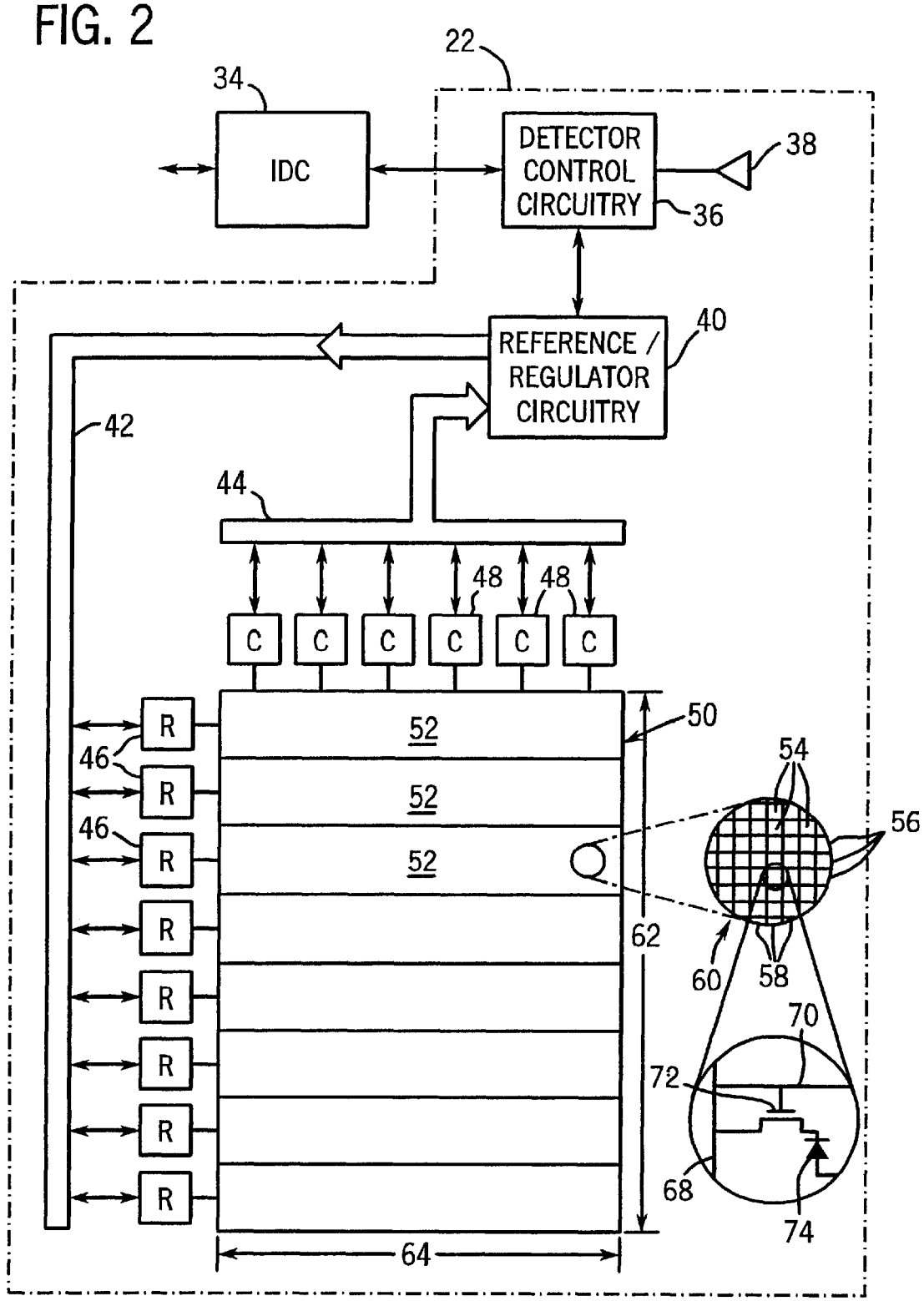

large table# SELF CYCLING SOLID STATE X-RAY DETECTOR

FIELD OF THE INVENTION

The present invention relates generally to imaging systems and, more particularly, to digital detectors. Even more particularly, the present invention relates to a novel technique for protecting and resetting a detector by self cycling read/scrub sequences.

BACKGROUND OF THE INVENTION

Digital imaging systems are becoming increasingly widespread for producing digital data, which can be reconstructed into useful images. In current digital imaging systems, such as digital X-ray systems, radiation from a source is directed toward a subject, typically a patient in a medical diagnostic application. A portion of the radiation passes through the patient and impacts a detector. The surface of the detector converts the radiation to light photons, which are sensed. The detector is divided into a matrix of discrete picture elements or pixels, and encodes output signals based upon the quantity or intensity of the radiation impacting each pixel region. Because the radiation intensity is altered as the radiation passes through the patient, the images reconstructed based upon the output signals provide a projection of the patient's tissues similar to those available through conventional photographic film techniques.

In available digital detectors, the surface of the digital detector is divided into a matrix of picture elements or pixels, with rows and columns of pixels being organized adjacent to one another to form the overall image area. When the detector is exposed to radiation, photons impact a scintillator coextensive with the image area. A series of detector elements are formed at row and column crossing points, each crossing point corresponding to a pixel making up the image matrix. In one type of detector, each element consists of a photodiode and a thin film transistor. The cathode of the diode is connected to the source of the transistor, and the anodes of all diodes are connected to a negative bias voltage. The gates of the transistors in a row are connected together and the row electrode is connected to scanning electronics. The drains of the transistors in each column are connected together and each column electrode is connected to additional readout electronics. Sequential scanning of the rows and simultaneous read out of the signal from the columns permits the system to acquire the entire array or matrix of signals for subsequent signal processing and display.

In use, the signals generated at the pixel locations of the detector are sampled and digitized. The digital values are transmitted to processing circuitry where they are filtered, scaled, and further processed to produce the image data set. The data set may then be used to store the resulting image, to display the image, such as on a computer monitor, to transfer the image to conventional photographic film, and so forth. In the medical imaging field, such images are used by attending physicians and radiologists in evaluating the physical conditions of a patient and diagnosing disease and trauma.

Typically, the read out of a solid state X-ray detector is initiated by the X-ray system. To minimize the effects of leakage, the detector is reset by special commands from a controller by reading the pixel circuits without collecting the data (sometimes referred to as "scrubbing") at some optimized rate. Normally, the system should read the detector yet not collect the data on a routine basis. However if a failure occurs at the system level, the system may fail to read or scrub the detector for very long periods. The effect of such a problem is that when thin film transistors (TFTs), which are switches that isolate the photodiodes, are not operated for long periods of time, their thresholds begin to shift. If the thresholds shift too severely, the TFTs no longer provide sufficient isolation, and the signal from each pixel may begin to leak. This results in the inability of the readout electronics to discern the desired exposure data on a pixel by pixel basis, and corrupts the image data.

A similar problem arises when, during the course of manufacturing, a detector is powered up without being attached to an X-ray system. If the detector is maintained under bias for extended periods without being attached to the system and therefore without being read or scrubbed, the threshold may shift and the detector may be damaged beyond reclamation.

There is need, therefore, for an improved technique for resetting digital detectors via self initiated reading or scrubbing operations preformed under a defined set of conditions.

SUMMARY OF THE INVENTION

The invention provides a technique for resetting charge on the rows and columns of pixels in a digital detector. The technique may be employed in both newly designed imaging systems, or may be retrofitted to systems to upgrade the image quality and to provide enhanced protection for the detector circuitry. The technique offers an automatic reset circuit which may be interconnected to a communication circuit to route both incoming and outgoing data between the detector and the control circuit. The automatic reset circuit may comprise various electronics to control the automatic reading of the detector. The reset circuit, for example, may include a receive state machine, a timer and a read out state machine and so forth. The system may be integrated with various resetting functions to further facilitate the efficiency and protect the image quality of the detector. Thus, monitoring functions, and commanding reset functions, may be integrated within one circuit.

BRIEF DESCRIPTION OF THE DRAWINGS

FIG. 2 is a diagrammatical representation of the functional circuitry for producing image data in a detector of the system of FIG. 1;

DETAILED DESCRIPTION OF THE INVENTION

Figure 1:
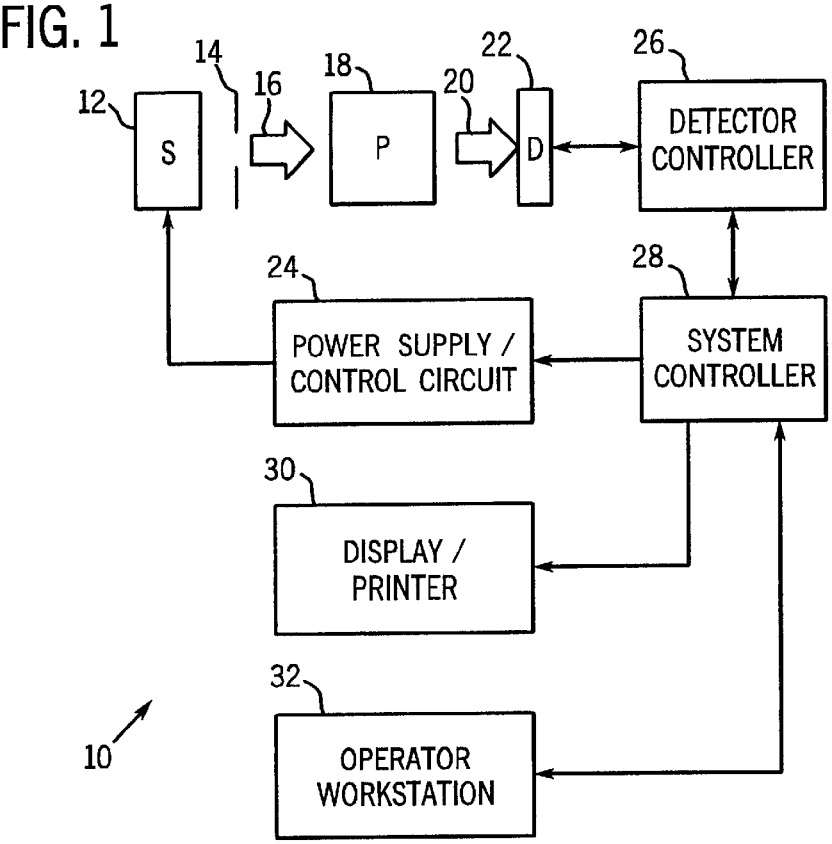
FIG. 1 is a diagrammatical overview of an exemplary imaging system, in the illustrated embodiment a digital X-ray imaging system, in which the present technique is incorporated.

FIG. 1 illustrates diagrammatically an imaging system 10 for acquiring and processing discrete pixel image data. In the illustrated embodiment, system 10 is a digital X-ray system designed both to acquire original image data, and to process the image data for display in accordance with the present technique. In the embodiment illustrated in FIG. 1, imaging system 10 includes a source of X-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital X-ray detector, represented generally at reference numeral 22. As described more fully below, detector 22 converts the X-ray photons received on its surface to lower energy photons, and subsequently to electric signals, which are acquired and processed to reconstruct an image of the features within the subject.

Source 12 is controlled by a power supply/control circuit 24 which furnishes both power and control signals for examination sequences. Moreover, detector 22 is coupled to a detector controller 26 which commands acquisition of the signals generated in the detector. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

FIG. 2 is a diagrammatical representation of functional components of digital detector 22, adapted to initiate self cycled resets of detector circuitry. FIG. 2 also represents an imaging detector controller or IDC 34 which will typically be configured within detector controller 26. IDC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row drivers and column sense electronics used to transmit signals during data acquisition phases of operation of the system. Circuitry 36 therefore transmits power and control signals to reference/regulator circuitry 40, and receives digital image pixel data from circuitry 40.

In a present embodiment illustrated, detector 22 consists of a scintillator that converts X-ray photons received on the detector surface during examinations to lower energy (light) photons. An array of photodetectors then converts the light photons to electrical signals which are representative of the number of photons or the intensity of radiation impacting individual pixel regions of the detector surface. Readout electronics convert the resulting analog signals to digital values that can be processed, stored, and displayed, such as in a display 30 or a workstation 32 following reconstruction of the image. In a present form, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics. The drains of the transistors in a column are connected together and an electrode of each column is connected to readout electronics.

In the particular embodiment illustrated in FIG. 2, by way of example, a row bus 42 includes a plurality of conductors for enabling readout from various rows of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each set of column sense electronics 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode may be accessed via readout electronics 48, and converted to digital signals for subsequent processing and image reconstruction.

Figure 3:
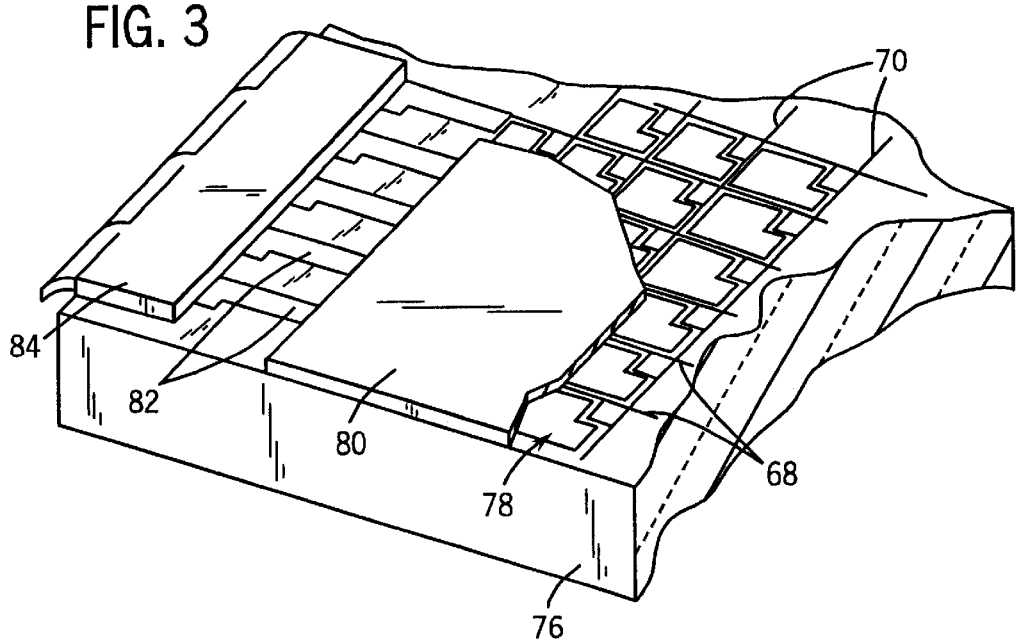
FIG. 3 is a partial sectional view illustrating an exemplary detector structure for producing the image data.

FIG. 3 generally represents an exemplary physical arrangement of the components illustrated diagrammatically in FIG. 2. As shown in FIG. 3, the detector may include a glass substrate 76 on which the components described below are disposed. Column electrodes 68 and row electrodes 70 are provided on the substrate, and an amorphous silicon flat panel array 78 is defined, including the thin film transistors and photodiodes described above. A scintillator 80 is provided over the amorphous silicon array for receiving radiation during examination sequences as described above. Contact fingers 82 are formed for communicating signals to and from the column and row electrodes, and contact leads 84 are provided for communicating the signals between the contact fingers and external circuitry.

In detectors such as that described above, during normal operation the control circuitry which commands readout of data following an exposure effectively resets all pixel circuitry in a manner which protects the pixel circuitry from damage which can result from charge leakage over time. When no exposure is made for extended periods, the detector controller, 26 from FIG. 1, may issue special commands for resetting the pixel circuitry in scrub operations. However, the present technique provides for self initiated resetting of the detector to provide protection for the pixel circuitry in the event the control circuitry does not issue a timely read or scrub command. Moreover, because the resetting operations are initiated by the detector, the technique offers enhanced protection for detectors which are powered up without being coupled to control circuitry, such as during manufacturing or quality control procedures.

Figure 4:
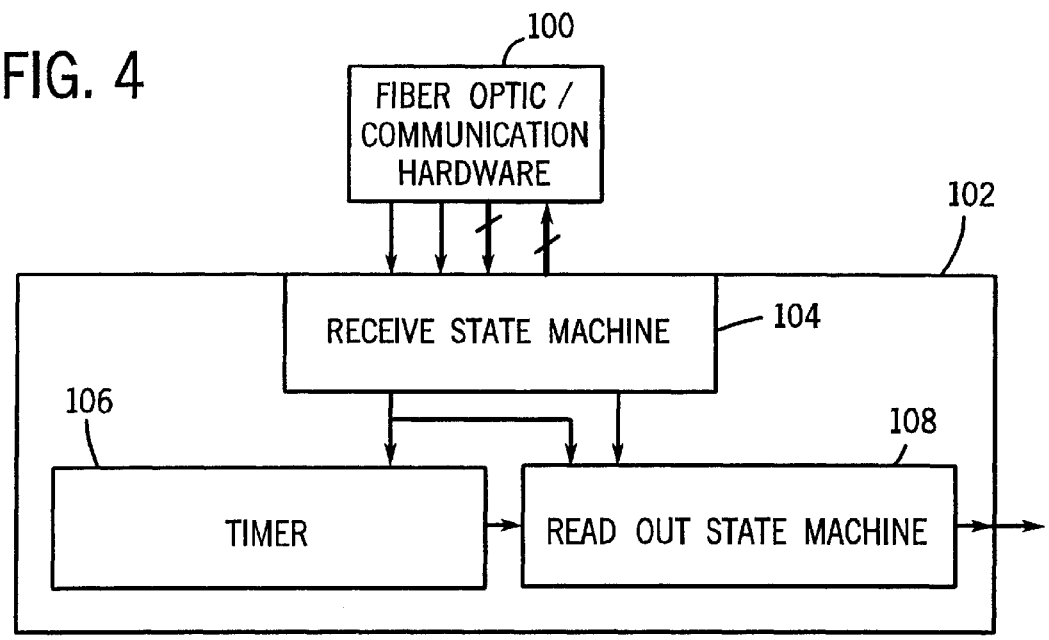
FIG. 4 is a diagrammatical overview of an automatic resetting circuit which initiates the read out of a detector.

Turning to FIG. 4, a block diagram for functional circuitry designed to cyclically reset the detector circuitry is provided illustrating communication circuitry 100, that is capable of establishing a link with a read/reset circuit 102. The communication circuitry 100 transmits commands from a readout circuit (such as originating in detector control circuit 36 of FIG. 2) to the read/reset circuit 102 to read out signals from the rows and columns of pixels. Thus, the communication circuitry 100 transmits read command instructions to the read/reset circuit 102. It should be noted that when a read out occurs, the charge on the individual pixels is recharged, obviating the need for a scrub operation at least during a short time interval.

In this embodiment the read/reset circuit 102 is shown as having a receive state machine 104, a timer 106 and a read out state machine 108. The read/reset circuit 102 is linked to the system via the communication hardware 100. Both the read/reset circuit 102 and the communication hardware 100 are part of the control circuit 36 in FIG. 2. Specifically, the receive state machine 104, shown incorporated in the read/reset circuit 102 is adapted to receive commands via the communication hardware 100. The timer 106 and the read out state machine 108 are also coupled to the receive state machine 104 and are adapted to receive commands, data and information as illustrated in FIG. 4. Further, the timer 106 is also coupled to the read out state machine 108. In a present embodiment, the read/reset circuit 102, with its constituent components, is formed by appropriate programming of a field programmable gate array on board the detector. Thus, a command may be initiated within the read/reset circuit 102 based upon data from the timer as described below.

Figure 5:
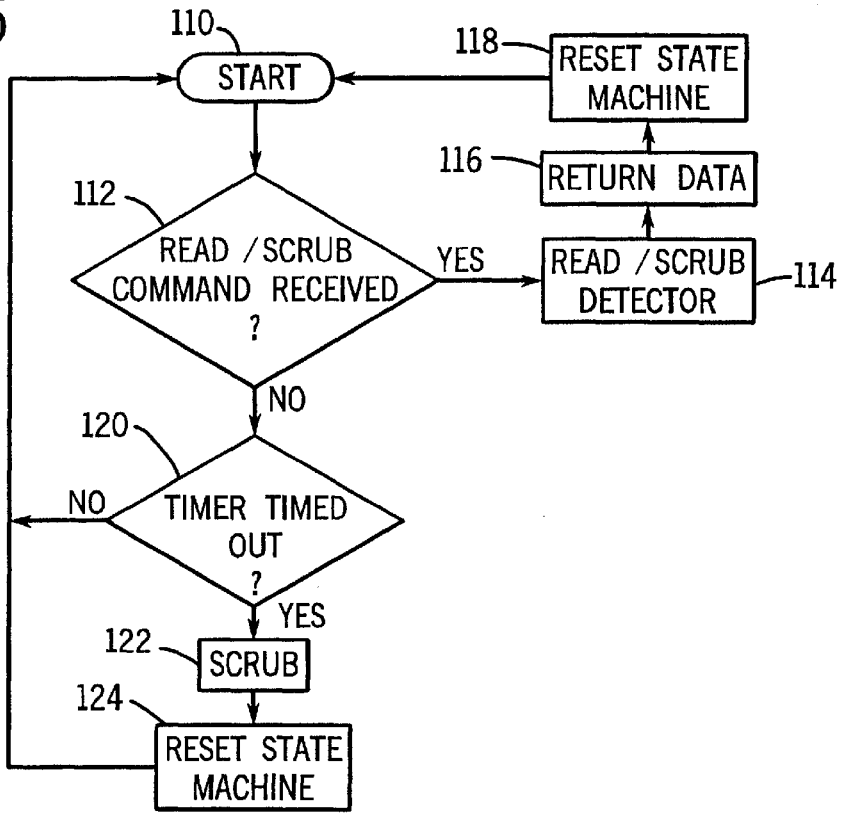
FIG. 5 is a flowchart representing the steps for initiating an automatic reset, such as a readout or scrub operation within an exemplary detector.

Referring to FIG. 5, a flowchart representing exemplary logic for reading and resetting the detector circuitry of FIG. 4 is illustrated. Generally, as an exposure is taken, the rows and columns of pixels within the detector lose their charge, while a readout or scrub command causes recharging of the pixels circuitry. Thus, in normal operation, beginning with step 110, read/reset circuit 102, awaits a read command from the system or a read command circuit (such as control circuit 36 of FIG. 2), as indicated at step 112. In the present embodiment, a timer is set at step 110 to permit self initiated resets as described below. When the read or scrub command is received, the control logic advances to step 114, at which time the detector pixel circuitry is read (i.e. recharged) and, if the command was a read command, data indicative of the effects of the exposure on the pixel charges is returned for processing, as indicated at step 116. It should be noted that in a present embodiment a scrub or resetting operation differs from a read operation in that in the former case no data is returned for processing. Once the data is returned, the read/reset circuit 102 is reset at step 118. As the circuit 102 is reset, the timer is restarted, and the logic returns to the initial sequence step 110.

If at step 112 a read or scrub command is not received via the communication circuit 100, the timer is checked at step 120 to determine whether an automatic readout or scrub is required (i.e. whether the timer has timed out). The timer is set to a predetermined amount of time, whereby the detector will reset the rows and columns of pixels if the read command is not received within that time period. Any suitable timing may be used at step 120 depending upon the characteristics of the pixel circuitry and its need for resetting. In a present embodiment, the timer times out in approximately 8 seconds. Thus, based upon the elapsed time since the previous reset, read or scrub, read/reset circuit 102 initiates resetting of the detector when a read command is not received before the predetermined amount of time.

As indicated in FIG. 5, if the timer is determined not to have timed out at step 120, the logic returns to step 110 and thereby to step 112 to await a read or scrub command from the detector control circuitry. When, after cycling through this logic, it is determined at step 120 that the timer has timed out, a scrub or reset is performed as indicated at step 122. Thereafter, the state machine is reset at step 124, as is the timer. With the detector thus reset, the logic returns to step 110 to await a read or scrub command.

As noted above, the present technique also provides protection for the detector circuitry in the event that communication of read or scrub commands cannot be received from the detector control circuitry, such as during manufacture, servicing, or when an unexpected interruption occurs in any part of the communication link including communication hardware circuit 100 of FIG. 4. To provide such functionality, the state of the communication circuit 100 is verified periodically, such as at step 112 of FIG. 5. If it is determined that communication is unavailable or has been interrupted, the read/reset circuit 102 will perform self-initiated resets of the pixel circuitry as described above. Where desired, such communication failure may cause the logic to enter into a special cyclic resetting loop similar to that summarized in FIG. 5, but with only the communication link being evaluated at step 112, until communication is restored.

As a variant on the logic discussed above, in a present implementation, a modal approach is employed in which the detector circuitry enters an "autoscrub" or "autoreset" mode to protect the pixel circuitry. In this approach, the autoscrub mode is entered if the communication circuit 100 is not detected (e.g. if the signal from the fiber channel to the circuit is not detected or is lost). Moreover, if a detector sync signal is not received by read/reset circuit 102 within a preset time period at step 120, such as 34+/−2 seconds in a present implementation, the autoscrub mode is entered. Of course, if the communication channel is active and read or scrub commands are timely received, the system simply continues to cycle without automatically resetting as discussed above.

Once the autoscrub mode is entered in the present implementation, if a command other than a sync command is received, the command is serviced and the system is then returned to the autoscrub mode. Thus, as long as the detector sync signals are received more frequently than the specified interval, the detector will follow the detector sync signals from the communication channel. Exit from the autoscrub mode occurs when the detector is power cycled, the communication channel signal is restored, and a period less than the specified interval has lapsed since the last detector sync (or a detector sync signal is received). At the conclusion of a commanded detector sync, the autoscrub timer is reset to zero.

In this present implementation, while in the autoscrub mode, the detector will be scanned (i.e. reset) at the maximum rate possible with the selected line timing. At the conclusion of one scrub, there will be a brief delay (on the order of microseconds) to determine whether a new command has been received. If no new command is pending, another scrub is performed. This process continues to provide the desired level of circuit protection so long as power is applied to the detector.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for resetting a digital detector, the detector having a plurality of rows and columns of pixels, the method comprising the steps of:

monitoring an input for a read command; and commanding a reset of the rows and columns of pixels of the detector if the read command is not received in a predetermined amount of time.

2. The method as recited in claim 1, wherein the step of resetting includes recharging the rows and columns of pixels.

3. The method as recited in claim 1, wherein the predetermined time is measured by a timer associated with the detector.

4. The method as recited in claim 3, wherein the timer is reset upon resetting the rows and columns of pixels.

5. The method as recited in claim 3, wherein the timer is reset upon receipt of the read command.

6. The method as recited in claim 1, wherein the step of resetting includes verifying whether a communications link is established with a read command circuit.

7. The method as recited in claim 6, wherein the step of verifying includes a further step of periodically resetting the rows and columns of pixels if no communication link is detected.

8. A detector for a radiographic imaging system comprising:

an array of pixels forming rows and columns, each pixel having a radiation detection circuitry for providing a signal from radiation received;

a read command circuit, commanding readout of signals from each pixel; and an automatic reset circuit, for resetting each pixel if a read command is not received in a predetermined amount of time.

9. The detector as in claim 8, wherein a timer determines whether the read command is not received in the predetermined amount of time.

10. The detector as in claim 8, wherein a communication verifying circuit determines whether a communications link is established between the read command circuit and the detector controller.

11. The detector as in claim 10, wherein if no communication link is detected, the automatic reset circuit periodically resets the rows and columns of pixels.

12. The detector as in claim 8, wherein the automatic reset circuit resets the rows columns of pixels by recharging the pixels.

13. The detector as in claim 8, wherein the read command circuit includes readout circuitry that is coupled to the rows and columns of pixels and enables readout of the pixels.

14. The detector as in claim 8, wherein the automatic reset circuit includes a state machine that monitors whether a read command is received from the read command circuit.

15. The detector as in claim 8, wherein the automatic reset circuit includes logic that verifies whether a communications link is established with the read command circuit.

16. The detector as in claim 14, wherein the state machine resets a timer upon receipt of the read command.

17. The detector as in claim 14, wherein if the state machine determines that no communication link is established, the reset circuit periodically resets the rows and columns of pixels.

18. A digital radiographic imaging system, comprising:

a source of radiation;

a control circuit to regulate the source of radiation; and a detector for receiving radiation from the source of radiation and generating signals therefrom, the detector having an array of pixels forming rows and columns, and a readout command circuit for commanding readout of signals from each pixel, the detector also having an automatic reset circuit for resetting each pixel if a read command is not received in a predetermined amount of time.

19. The system as in claim 18, wherein the detector includes a timer for measuring the predetermined amount of time.

20. The system as in claim 19, wherein the timer is reset upon receipt of the read command.

21. The system as in claim 19, wherein the timer is reset upon resetting of the rows and columns of pixels.

22. The system as in claim 18, wherein a state machine resets a timer based upon receipt of the read command.

23. The system as in claim 18, wherein the automatic reset circuit, includes logic that monitors whether a communication link is established with the readout command circuit.

24. The system as in claim 22, wherein the automatic reset circuit periodically resets rows and columns of pixels if the state machine determines that no communication link is established with the read command circuit.

* * * * *